(12) United States Patent
Ardes (10) Patent No.: US 10,463,996 B2
(45) Date of Patent: Nov. 5, 2019

(54) FILTER WHICH CAN BE ATTACHED TO A CONNECTION FLANGE AND FILTER INSERT FOR SAID FILTER

(71) Applicant: Hengst SE, Muenster (DE)

(72) Inventor: Wilhelm Ardes, Ascheberg (DE)

(73) Assignee: Hengst SE, Muenster (DE)

( * ) Notice: Subject to any disclaimer, the term of this patent is extended or adjusted under 35 U.S.C. 154(b) by 0 days.

(21) Appl. No.: 15/755,833

(22) PCT Filed: Aug. 23, 2016

(86) PCT No.: PCT/EP2016/069895
§ 371 (c)(1),
(2) Date: Feb. 27, 2018

(87) PCT Pub. No.: WO2017/036855
PCT Pub. Date: Mar. 9, 2017

(65) Prior Publication Data
US 2018/0326328 A1    Nov. 15, 2018

(30) Foreign Application Priority Data
Aug. 28, 2015  (DE) .................. 10 2015 114 313

(51) Int. Cl.
*B01D 29/15*  (2006.01)
*B01D 29/21*  (2006.01)

(52) U.S. Cl.
CPC ........ *B01D 29/15* (2013.01); *B01D 2201/291* (2013.01); *B01D 2201/304* (2013.01)

(58) Field of Classification Search
None
See application file for complete search history.

(56) References Cited

U.S. PATENT DOCUMENTS 4,623,456 A * 11/1986 Ratner ............... B01D 35/30
210/232
5,207,811 A * 5/1993 Buonpastore ...... B01D 46/0049
55/498
2016/0220931 A1 8/2016 Ardes

FOREIGN PATENT DOCUMENTS

DE      267 16 366    * 12/1997
DE      29716366       12/1997
(Continued)

OTHER PUBLICATIONS

International Search Report, dated Nov. 25, 2016, priority document.

*Primary Examiner* — Benjamin M Kurtz
(74) *Attorney, Agent, or Firm* — Greer, Burns & Crain, Ltd.

(57) ABSTRACT

A filter which can be attached to a connection flange, wherein the filter has an exchangeable filter insert having a hollow cylindrical filter material body enclosed on its faces by two end plates, wherein the filter has a cup-shaped housing, which can be sealed in the assembled state on the free edge against a sealing surface of the connection flange by means of a circumferential seal, and wherein the seal is arranged on the outside circumference of a circumferential seal carrier forming a part of the filter insert. The filter seal is a sealing ring having a rectangular cross-section in an unloaded state, radial contours being arranged on the outer circumference of the seal carrier, and, during assembly of the housing, the seal can be pressed into the engagement contours and is permanently malleable, undergoing axial shortening and radial expansion on the inner circumference thereof.

16 Claims, 13 Drawing Sheets

(56) References Cited

FOREIGN PATENT DOCUMENTS

DE  20 2014 104 029  * 10/2014
DE  202014104029  10/2014

* cited by examiner

FILTER WHICH CAN BE ATTACHED TO A CONNECTION FLANGE AND FILTER INSERT FOR SAID FILTER

CROSS-REFERENCES TO RELATED APPLICATIONS

This application claims the benefit of the German patent application No. 10 2015 114 313.5 filed on Aug. 28, 2015, the entire disclosures of which are incorporated herein by way of reference.

BACKGROUND OF THE INVENTION

The present invention relates to a filter that can be attached to a connecting flange, the filter having an exchangeable filter insert having a hollow cylindrical filter material body enclosed at its end faces by two end discs, the filter having a cup-shaped housing that can be sealed at its free edge by a peripheral seal, in the mounted state, against a sealing surface of the connecting flange, and the seal being situated on the outer periphery of a peripheral seal bearer that forms a part of the filter insert. Moreover, the present invention relates to a filter insert for use in the filter.

A filter of the type named above and an associated filter insert are known from DE 20 2014 104 029 U1. It has turned out to be desirable to improve the known filter so that it is more reliably provided that when the filter is removed in order to change the filter insert, the seal remains on the seal bearer, i.e., does not remain on the sealing surface of the connecting flange, from where it would then have to be manually removed, which is difficult. Moreover, a suitable filter insert is to be provided.

SUMMARY OF THE INVENTION

A part of an object relating to the filter is achieved according to the present invention by a filter of the type named above that is characterized in that the seal is a sealing ring having a rectangular cross-section in its unloaded initial state, and that radial engagement contours are situated on the outer periphery of the seal bearer, and that during mounting of the housing the seal can be pressed into the engagement contours, with axial shortening and radial expansion at its inner periphery, and can be permanently reshaped.

The present invention advantageously provides, in a simple manner, an adequately secure axial hold of the seal on the seal bearer, so that during a change of filter insert the seal is reliably also changed without any special additional handling. Here, the seal has a simple initial shape and can therefore be manufactured at low cost. Its particular shape that provides its axial hold on the seal bearer is imparted to the seal only after its installation, through the reshaping that takes place in the installed state, which does not revert when the filter is removed for the purpose of changing the filter insert. Thus, during the time of use of the filter insert a positive-fit mutual engagement is formed between the seal and the seal bearer that does not revert and that is capable of transmitting the axial forces necessary for a reliable carrying along of the seal during the removal of the filter for the purpose of changing the filter insert.

Preferably, the seal is an extruded sealing ring made of an elastomer.

The elastomer is preferably an ethylene acrylate or polyacrylate rubber or a nitrile rubber or a fluorosilicone rubber or an ethylene propylene diene rubber or a fluorine rubber having a hardness between 60 and 70 Shore A.

So that the seal is reliably held on the seal bearer during mounting of the filter, stops that are situated at a distance from one another in the axial direction of the seal bearer and that limit an axial play of the seal on the seal bearer to a specifiable extent, are usefully situated on the outer periphery of the seal bearer.

Advantageously, here at least one of the stops is formed by the radial engagement contours.

The outer periphery of the seal bearer can have various shapes in order to achieve the desired properties and functions.

An embodiment provides that one or more peripheral ribs or grooves, made so as to be continuous or segmented in the peripheral direction, are provided on the outer periphery of the seal bearer.

Another embodiment provides that one or more peripheral series of holes or blind holes or lugs or cams, made so as to be continuous or segmented in the peripheral direction, are situated on the outer periphery of the seal bearer.

According to a further embodiment, a series of axially outwardly open indentations or recesses, peripheral on an axial edge of the seal bearer, or two such series, peripheral on both axial edges of the seal bearer, in either case continuous or segmented in the peripheral direction, are formed on the outer periphery of the seal bearer.

In a further embodiment, hook arms are situated on the seal bearer in its axial edge region facing the filter insert, the arms pointing in the direction toward the interior of the housing, and the arms being capable of being compressed radially inward, so as to be capable of being reset, through contact with the inner periphery of the housing during its mounting.

In order to achieve the second part of the object, a filter insert for use in a filter is proposed, the filter insert being formed by a hollow cylindrical filter material body enclosed at its end faces by two end discs, and a seal being situated on the outer periphery of a peripheral seal bearer forming a part of the filter insert, the filter insert being characterized in that the seal is a sealing ring having a rectangular cross-section in an unloaded initial state, and that radial engagement contours are situated on the outer periphery of the seal bearer, and that during mounting of the housing of the filter the seal can be pressed into the engagement contours and can be permanently reshaped, with axial shortening and radial expansion at its inner periphery.

In this way, a filter insert is provided that is fitted specifically to the filter described above, and that works together with this filter in order to achieve the desired properties and functions.

The advantages of the present invention can be summarized as follows:

- a profiled seal is formed during operation, from a low-cost extruded square or rectangular seal;
- the seal is held captive during maintenance when the filter insert is exchanged;
- because elastomers are practically noncompressible, their volume remains constant under load, so that the seal expands radially when compressed axially;
- because in the installed state the seal is limited axially at both sides and radially outwardly by the housing and by the sealing surface of the filter connecting flange, the material of the seal takes the path of least resistance, and necessarily follows the radial engagement contour of the seal bearer with a positive fit;
- during maintenance of the filter, the engagement between the radial engagement contour and the seal ensures that the seal remains attached in captive fashion on the seal bearer and thus on the filter insert, and does not remain adhered to the sealing surface of the connecting flange; there is a large degree of freedom for the shape of the radial engagement contour on the seal bearer, including for example raised shapes such as one or more peripheral ribs or segmented rib parts or individual knobs or series of knobs, or recessed shapes such as peripheral or segmented grooves or one or more series of holes or undercuts. Here, the engagement contours can be made on and/or in the outer peripheral surface or on or in the axially upper and/or lower edge of the seal bearer.

BRIEF DESCRIPTION OF THE DRAWINGS

In the following, exemplary embodiments of the present invention are explained on the basis of a drawing.

DETAILED DESCRIPTION OF THE PREFERRED EMBODIMENTS

In the following description of the Figures, identical parts in the various drawings are always provided with the same reference characters, so that all reference characters do not have to be explained again for each drawing.

Figure 1:
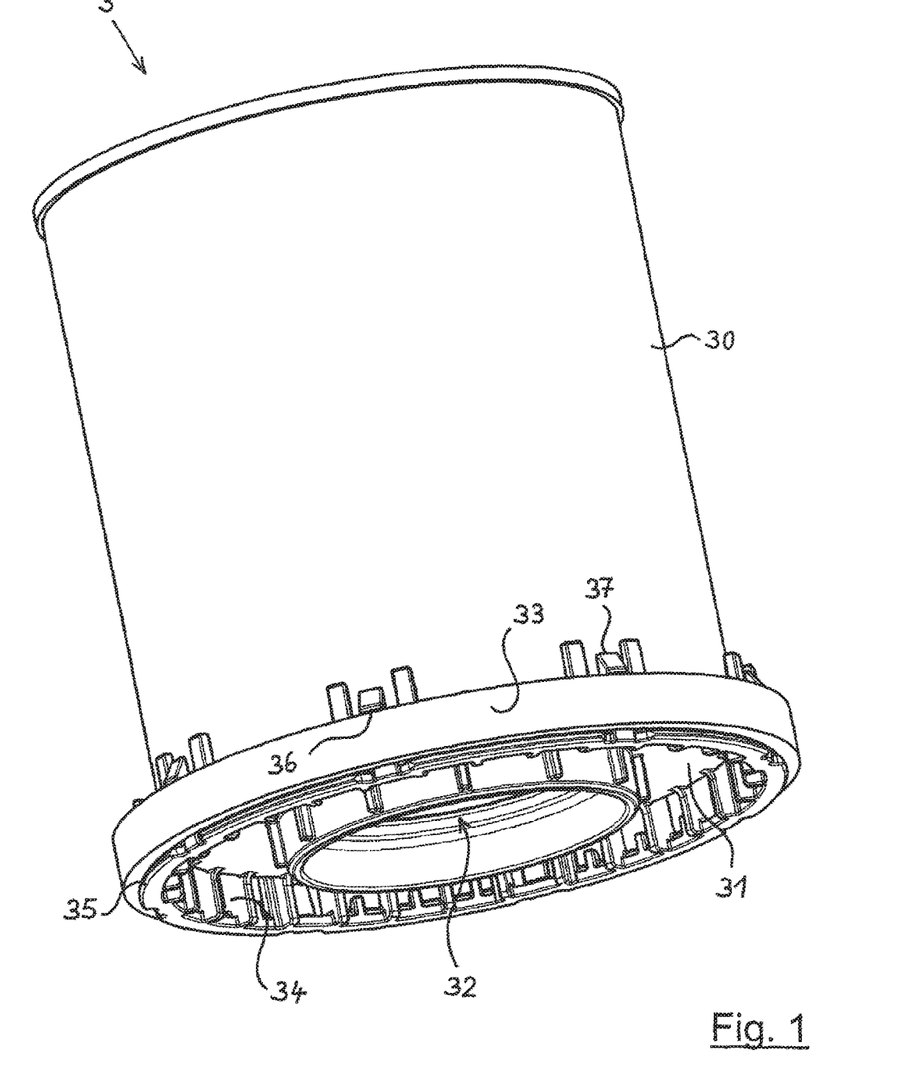
FIG. 1 shows a filter insert having a seal bearer and seal in an oblique view from below.

FIG. 1 of the drawing shows a filter insert 3 with seal bearer 34 and seal 33, in an oblique view from below. Filter insert 3 is made up of a hollow cylindrical filter material body 30 that is covered at least on its end face pointing downward in FIG. 1 by an end disc 31 having a central perforation 32. In the depicted example, the second, upward-pointing end face of filter material body 30 is covered by another end disc. With perforation 32 in end disc 31, filter insert 3 can be plugged onto a connecting socket of an associated filter in a known manner Seal bearer 34 is made in one piece with lower end disc 31, the seal bearer having on its outer periphery a peripheral surface on which seal 33 is situated. Here, in its unloaded initial state seal 33 has the shape of a sealing ring having a rectangular cross-section, and is made, for example, of an extruded elastomer.

On the lower edge of seal bearer 34, an outward-pointing radial engagement contour 35 is integrally formed in the shape of a rib or a bulge. Seen in the peripheral direction, from the upper edge of seal bearer 34 hook arms 37 go upward, i.e., in the direction towards filter material body 30, at regular intervals, which arms are situated radially external to the outer periphery of filter material body 30. Each hook arm 37 forms at its free end an axial stop 36 in the form of a lug. Stops 36 and engagement contours 35 together limit the axial play of seal 33 on seal bearer 34, and, in particular, prevent seal 33 from sliding or moving off seal bearer 34 before installation of the filter insert 3 in an associated housing (not shown in FIG. 1).

Figure 2:
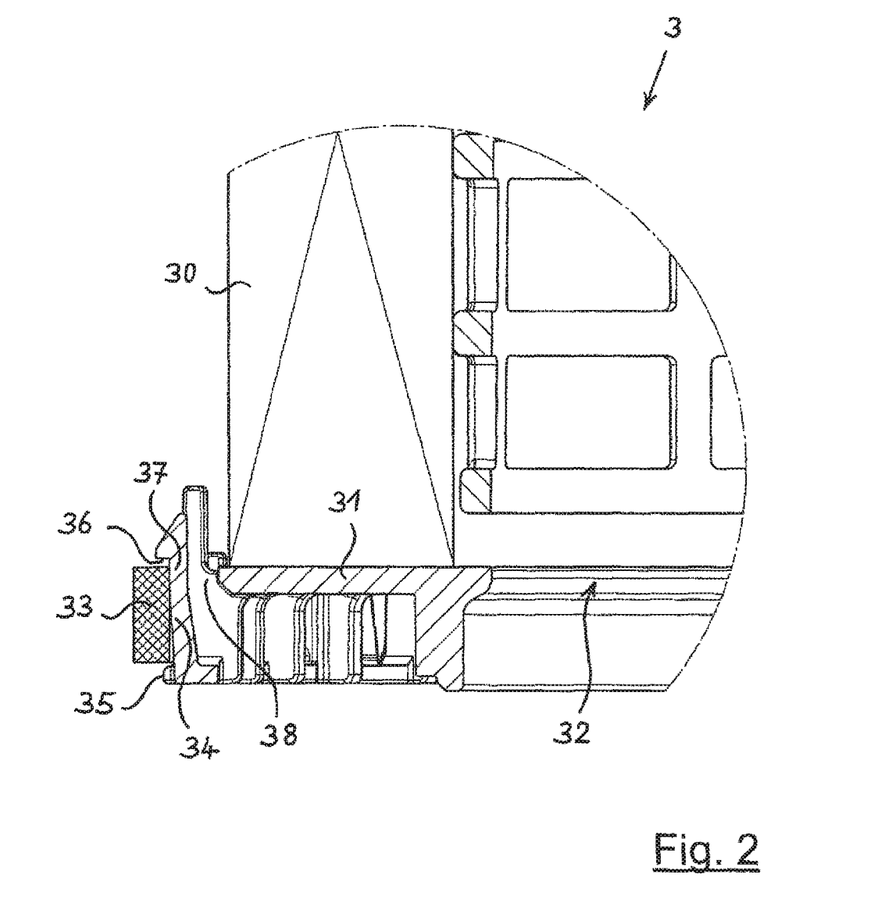
FIG. 2 shows a detail from the left lower end region of the filter insert of FIG. 1, in longitudinal section in a first sectional plane.

FIG. 2 shows a detail from the left lower end region of filter insert 3 of FIG. 1, in longitudinal section in a first sectional plane. At the bottom in FIG. 2, a part of end disc 31 with central perforation 32 is visible. From end disc 31, filter material body 30 extends upward, in which body a support mesh is situated in a known manner.

Radially externally from the actual end disc 31, and made in one piece therewith, there runs seal bearer 34, on whose outer periphery the sealing ring, which here still has its initial shape and has a rectangular cross-section, is situated as seal 33. An undesired shifting of seal 33 on seal bearer 34 is prevented in this state by radial engagement contour 35, integrally formed at the bottom on seal bearer 34, and by hook arm 37, here visible in section and having axially upper stop 36.

Between end disc 31 and seal bearer 34 there are provided through-openings 38, which during operation of filter insert 3 enable fluid that is to be cleaned to flow from below to the outer periphery of filter material body 30.

Figure 3:
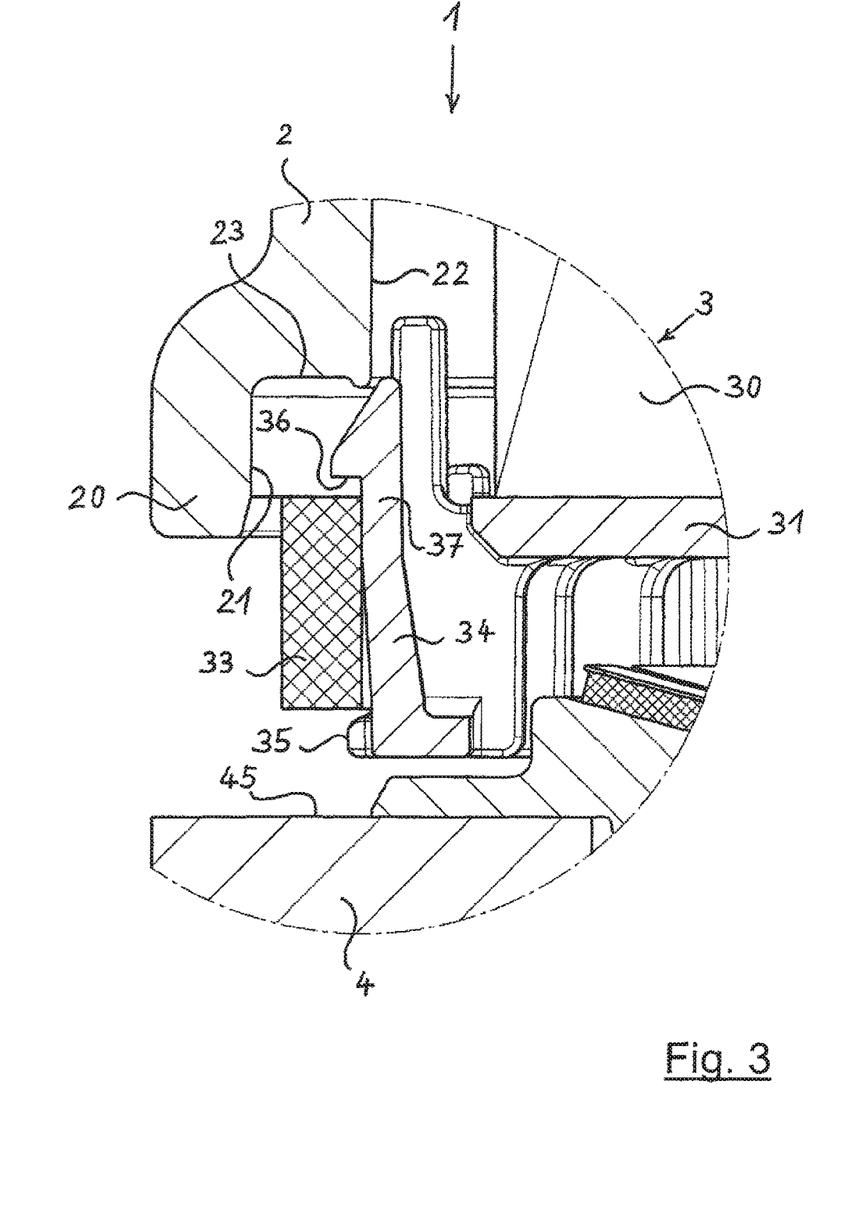
FIG. 3 shows a part of a filter in a detail, with the left lower end region of the filter insert of FIG. 2 together with a part of a filter housing, during installation of the filter on an installation flange, also in longitudinal section.

FIG. 3 shows a segment of a filter 1 in detail, with the left lower end region of filter insert 3 of FIG. 2 together with a part of a filter housing 2, during installation of filter 1 on a connecting flange 4, also in longitudinal section. Here, filter insert 3 is already in its installed position relative to connecting flange 4, while the housing is still at a certain distance from connecting flange 4 and from a sealing surface 45 located there. Seal 33 situated on seal bearer 34 also has here, on its end face pointing toward connecting flange 4, a distance from the associated sealing surface 45 of connecting flange 4. Seal 33 on seal bearer 34 is thus here still unloaded, and still has its initial shape, which is rectangular in cross-section.

Housing 2 of filter 1 has a free edge 20, expanded in its diameter, having an inner periphery 21. Above free edge 20, housing 2 has a diameter step 23, and above this has a somewhat smaller diameter and there has an inner periphery 22.

Figure 4:
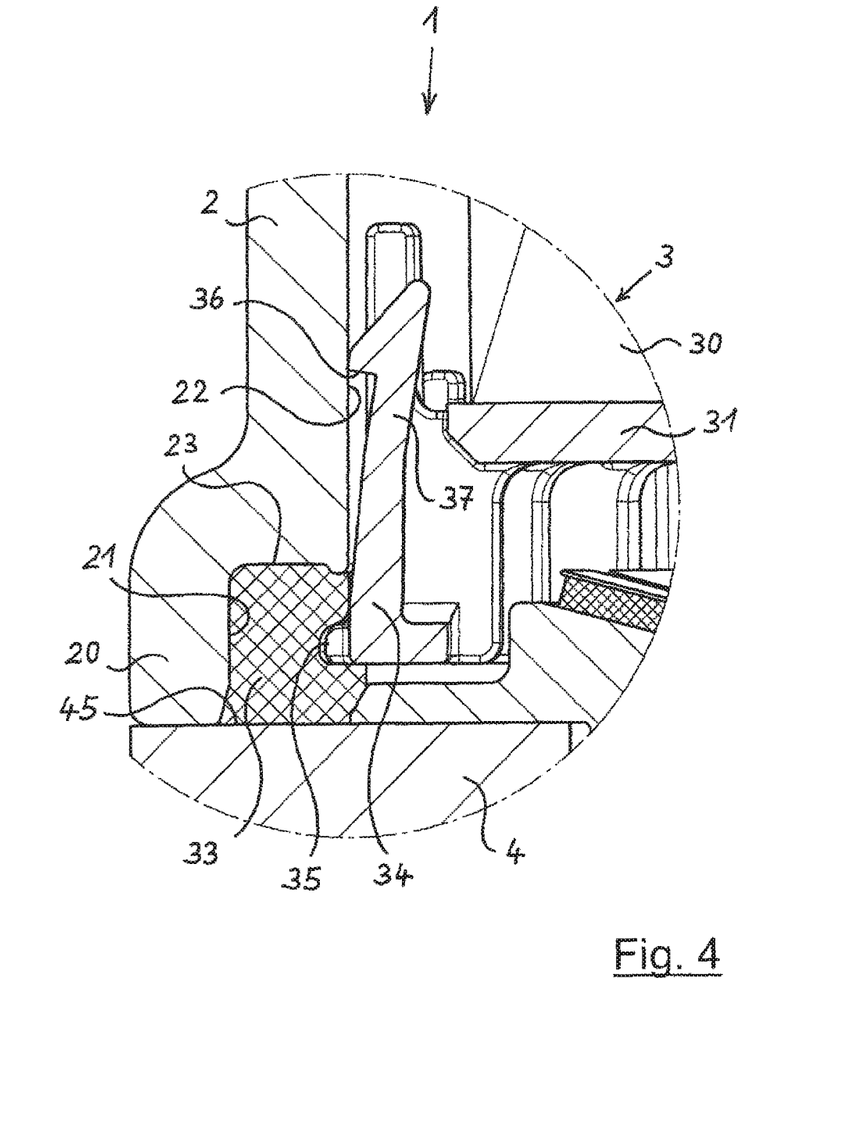
FIG. 4 shows the detail of FIG. 3 after the mounting of the filter on the filter connecting flange, in longitudinal section.

FIG. 4 shows the detail of FIG. 3 after mounting filter 1 on filter connecting flange 4, in longitudinal section. Housing 2 has now also reached its final assembled position relative to connecting flange 4, in which housing 2 lies on connecting flange 4 with the end face of its free edge 20. Through diameter step 23, seal 33 on seal bearer 34 is shifted axially in the direction toward sealing surface 45 of connecting flange 4, and is pressed onto sealing surface 35 with axial shortening. Due to an essentially hydraulic behavior of the material, such as elastomer, of seal 33, its axial shortening causes an expansion of seal 33 in the radial direction. An expansion radially outward is limited by inner periphery 21 of free edge 20 of housing 2, so that practically only an expansion predominantly in the radially inward direction is possible and takes place, in which the material of seal 33 moves radially inward, moving axially past the radial, bulge-shaped engagement contour 35, above and below the contour.

Because during normal operation housing 2, with filter insert 3 and seal 33, remains in the position shown in FIG. 4 for a longer period of time, in practice usually several or many months, the outline shape of seal 33 visible in FIG. 4 is permanently imprinted therein.

Hook arm 37 visible in FIG. 4 is compressed inward in the radial direction through contact with inner periphery 22 of housing 2, causing its lug-shaped, radially outward-pointing stop 36 to lie on inner periphery 22 of housing 2 with a certain degree of friction. This friction ensures that during disassembly of filter 1 including removal of housing 2 from connecting flange 4, filter insert 3 is also taken from housing 2. Radial engagement contour 35 equally provides a reliable carrying along of seal 33 during removal of housing 2 and filter insert 3 from connecting flange 4.

Figure 5:
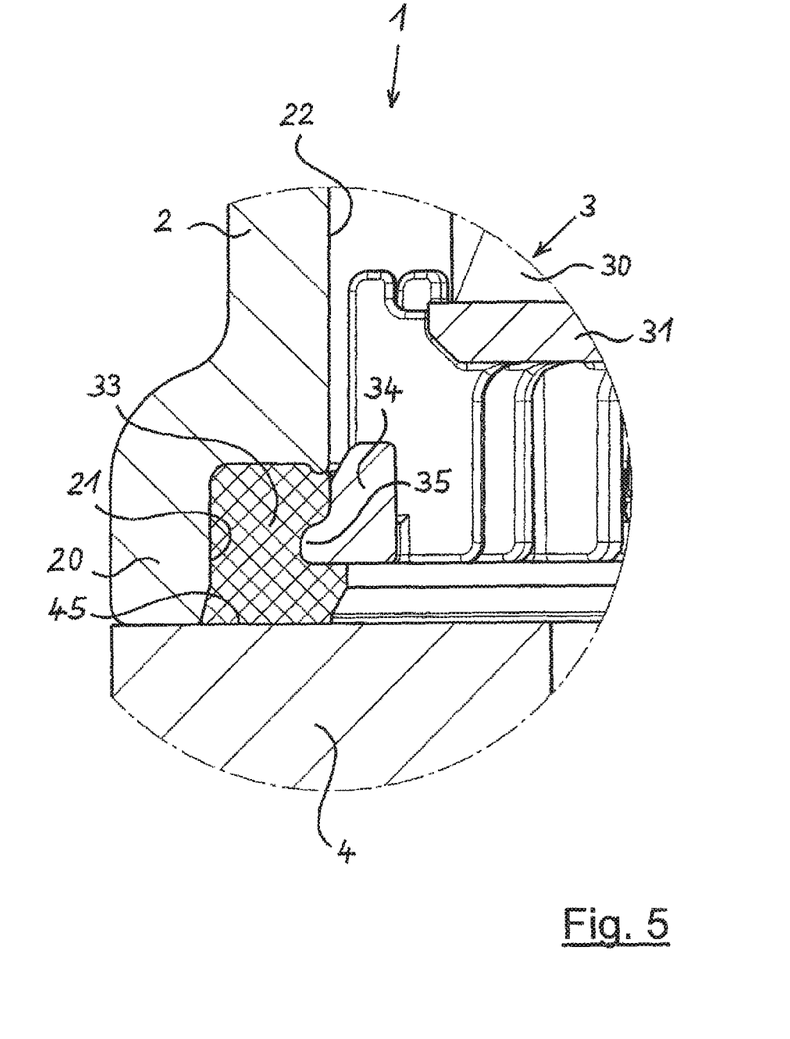
FIG. 5 shows the detail of FIG. 4 in longitudinal section along a second sectional plane rotated relative to FIG. 4.

FIG. 5 shows a detail of FIG. 4 in longitudinal section along a second sectional plane, rotated relative to FIG. 4, that does not run through one of hook arms 37. Here as well, radial engagement contour 35 extends into the inner periphery of seal 33, in order to reliably remove this seal from connecting flange 4 during a later disassembly of filter 1 with filter insert 3, in the axial direction.

Figure 6:
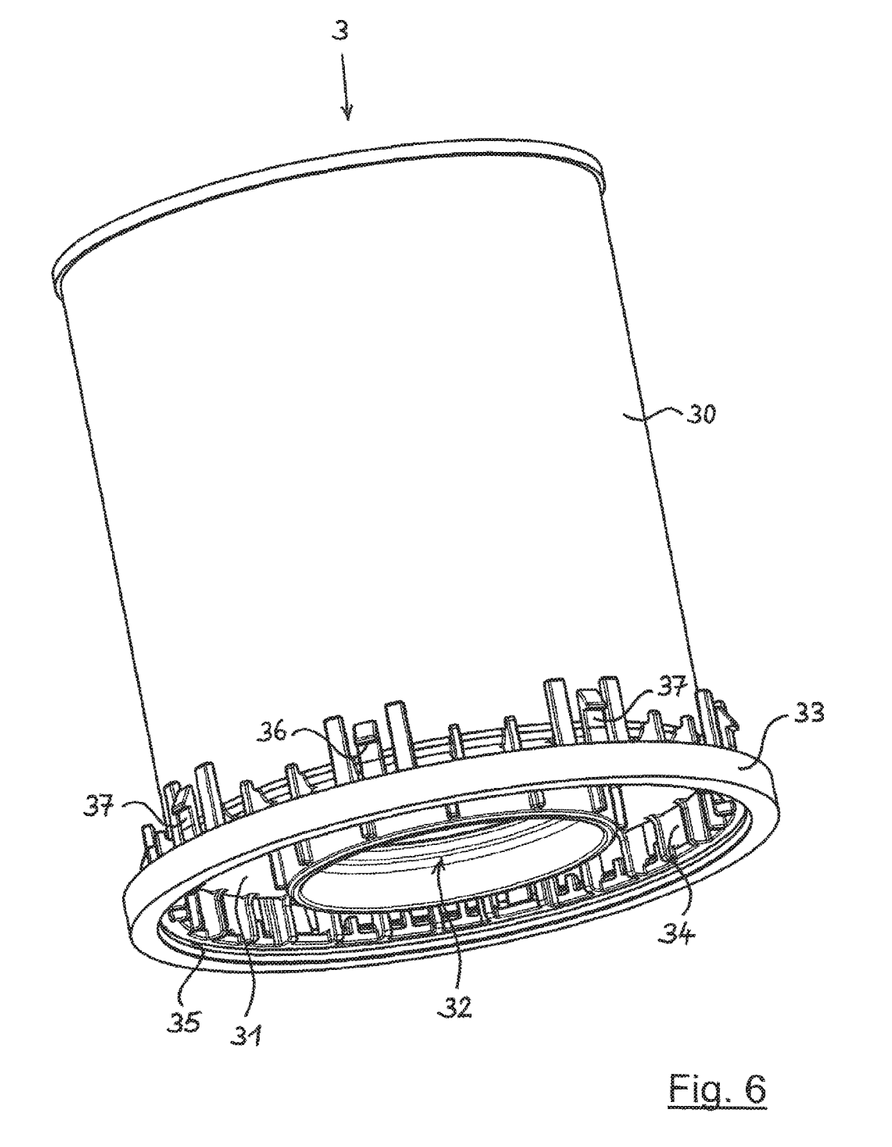
FIG. 6 shows the filter insert after removal from the housing of the filter, in an oblique view from below.

FIG. 6 shows disassembled filter insert 3 after removal from housing 2 of filter 1, in an oblique view from below. Differing from the initial situation shown in FIG. 1, here seal 33 is seated further down in the axial direction on seal bearer 34, and radial engagement contour 35, which in the state shown in FIG. 1 was still axially below seal 33, is now in engagement with the inner periphery of seal 33. Correspondingly, stops 36 on hook arms 37 now have a larger axial distance from the upper end face of seal 33.

Figure 7:
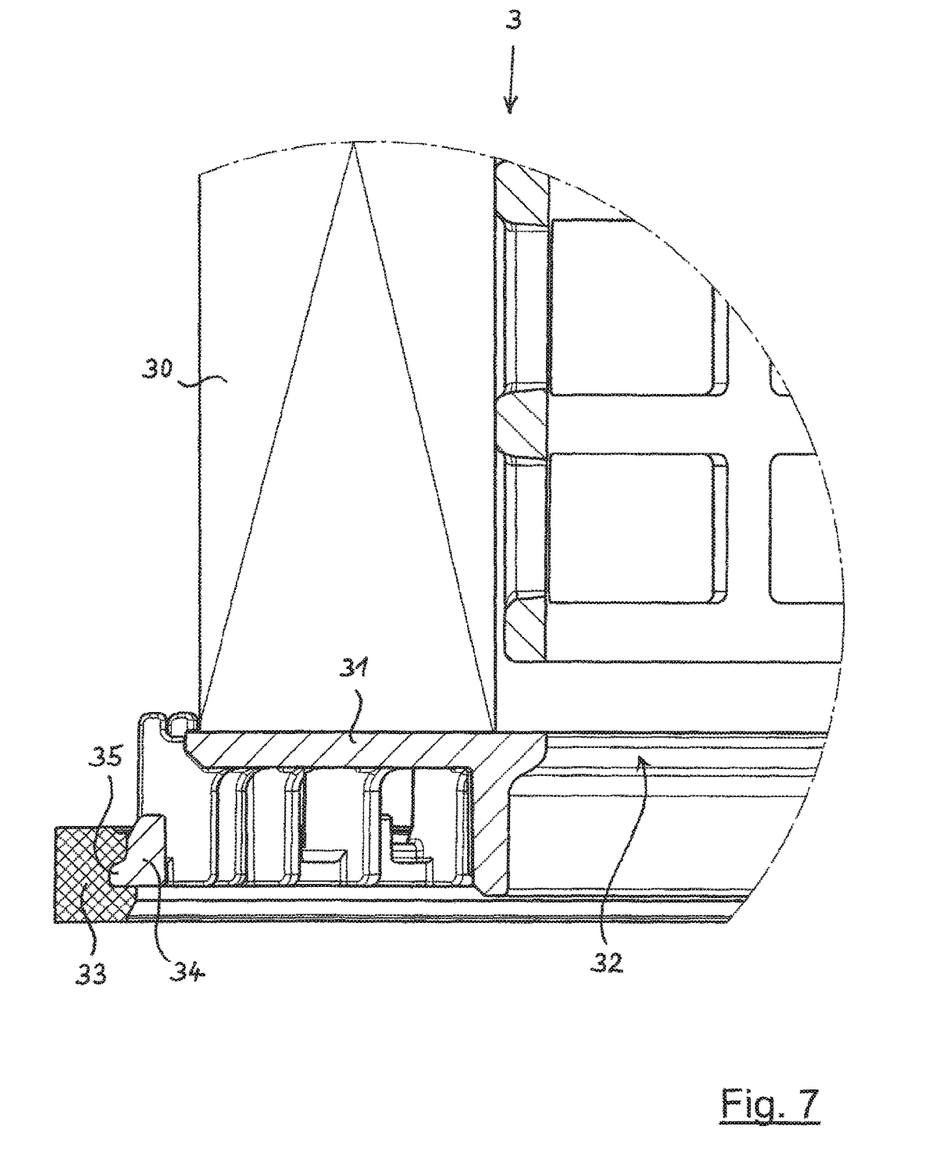
FIG. 7 shows a detail from the left lower end region of the filter insert of FIG. 6, in longitudinal section.

FIG. 7 shows a detail from the left lower end region of the removed filter insert 3 of FIG. 6, in longitudinal section. After the disassembly of filter 1, seal 33, which is reshaped during its time of use, retains its reshaped shape in which radial engagement contour 35 extends into and engages in the inner periphery of seal 33. It is thus ensured that during removal of filter insert 3, seal 33 remains on filter insert 3, or more precisely on seal bearer 34 of filter insert 3, without requiring for this purpose that seal 33 already have, in its initial state, a complicated cross-sectional shape that would be expensive to manufacture.

FIGS. 8 through 13 show seal bearer 34 in various embodiments of its radial engagement contours 35, each in a front view, in one or two partial cross-sections and a partial longitudinal section, wherein seal 33, in its relaxed initial state, is also shown in each of the partial sections.

Figure 8:
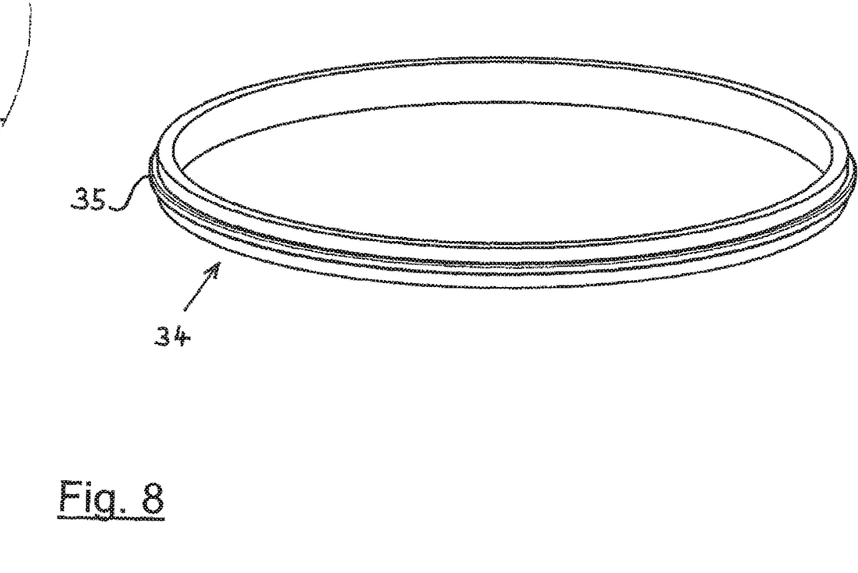
FIGS. 8 through 13 show the seal bearer in various embodiments, each in a front view and in two sections running perpendicular to each other.

In FIG. 8, the radial engagement contours 35 on the outer periphery of seal bearer 34 are formed by a peripheral rib that is continuous in the peripheral direction, and which also extends into the inner periphery of seal 33 already in the initial state of seal 33, thus holding seal 33 securely on seal bearer 34 from the beginning.

Figure 9:
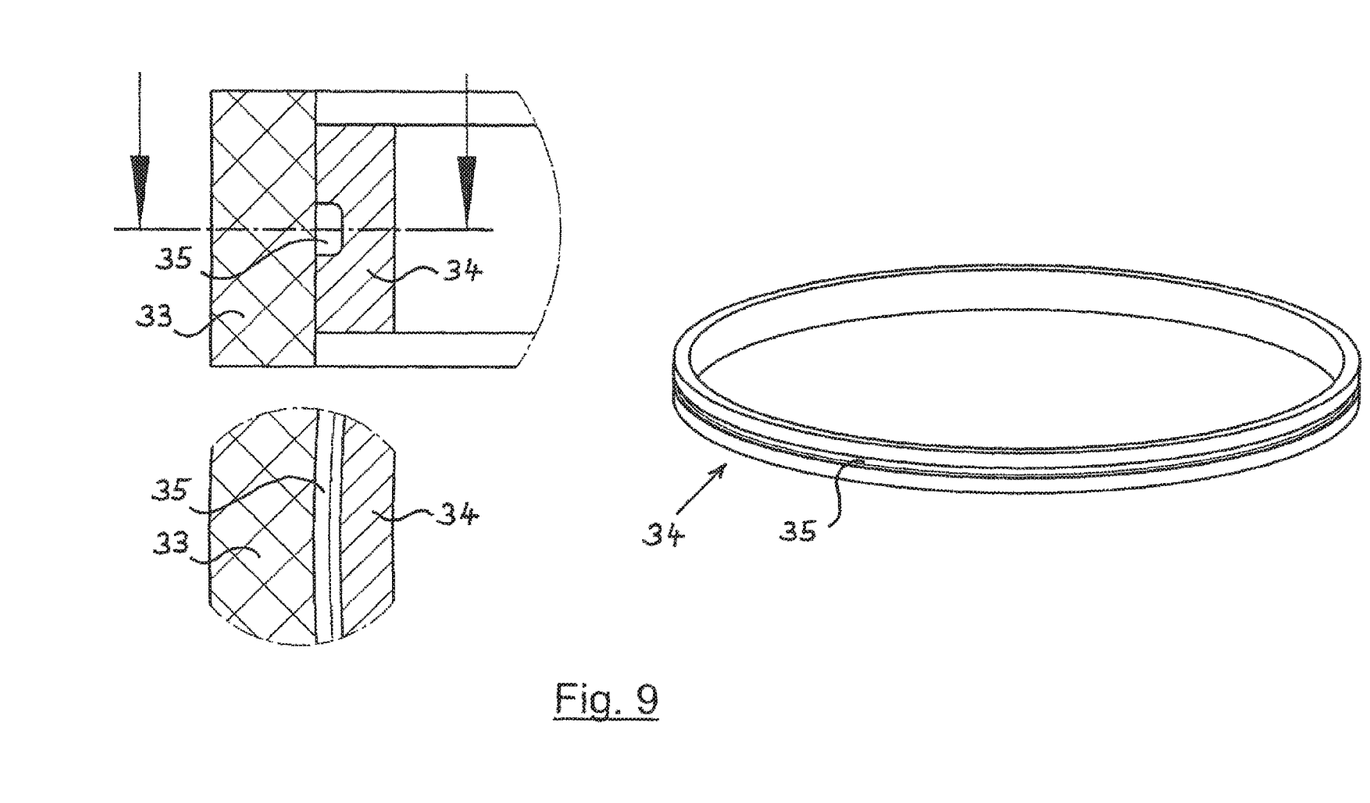

In FIG. 9, the radial engagement contours 35 on the outer periphery of seal bearer 34 are formed by a peripheral groove that is continuous in the peripheral direction, into which groove the seal does not yet engage in its relaxed initial state; here, the mutual engagement arises only when the filter is mounted, as explained above.

Figure 10:
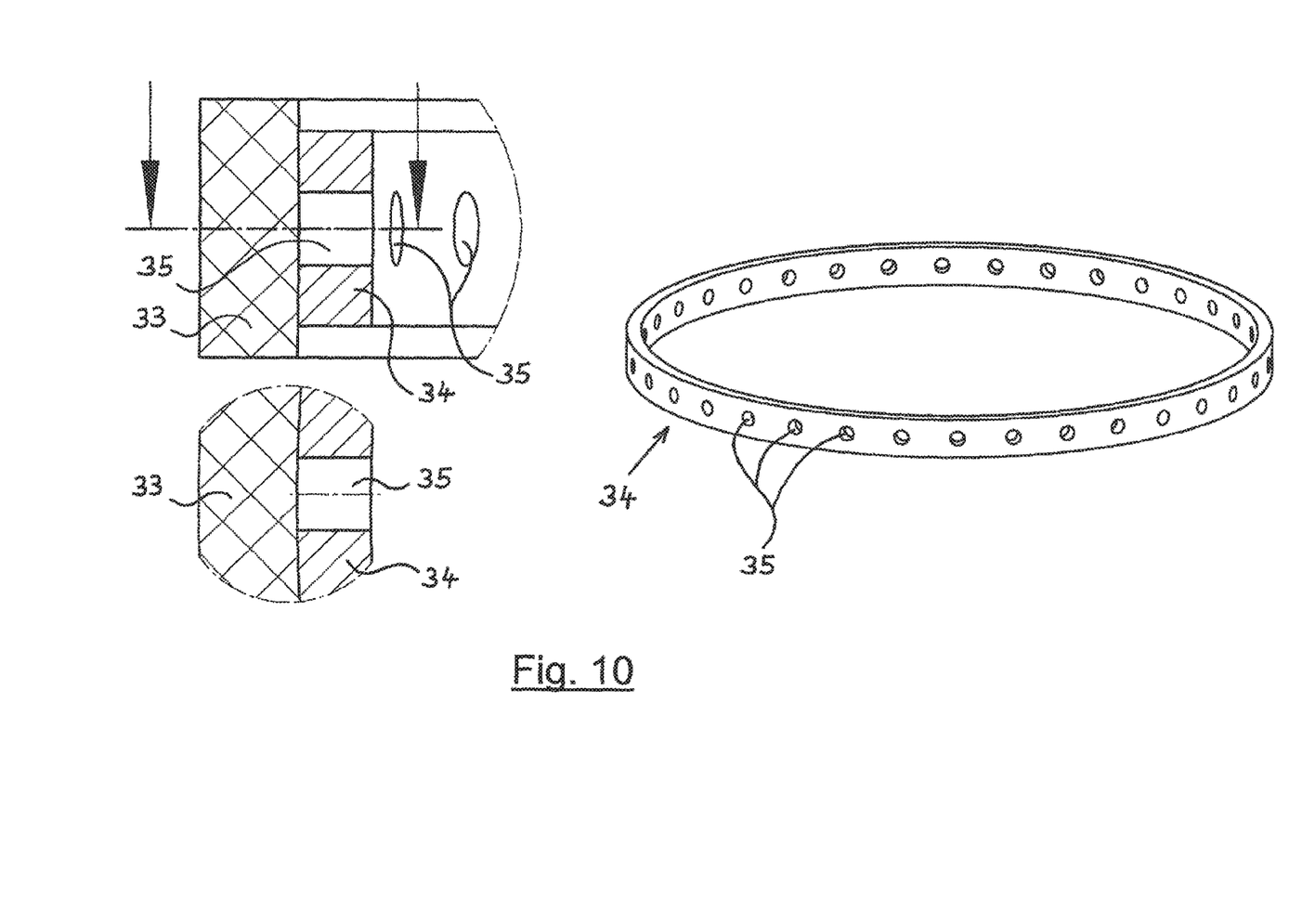

In FIG. 10, the radial engagement contours on the outer periphery of seal bearer 34 are formed by a peripheral series of holes that run radially through seal bearer 34 and that are spaced at a distance from one another in the peripheral direction.

Figure 11:
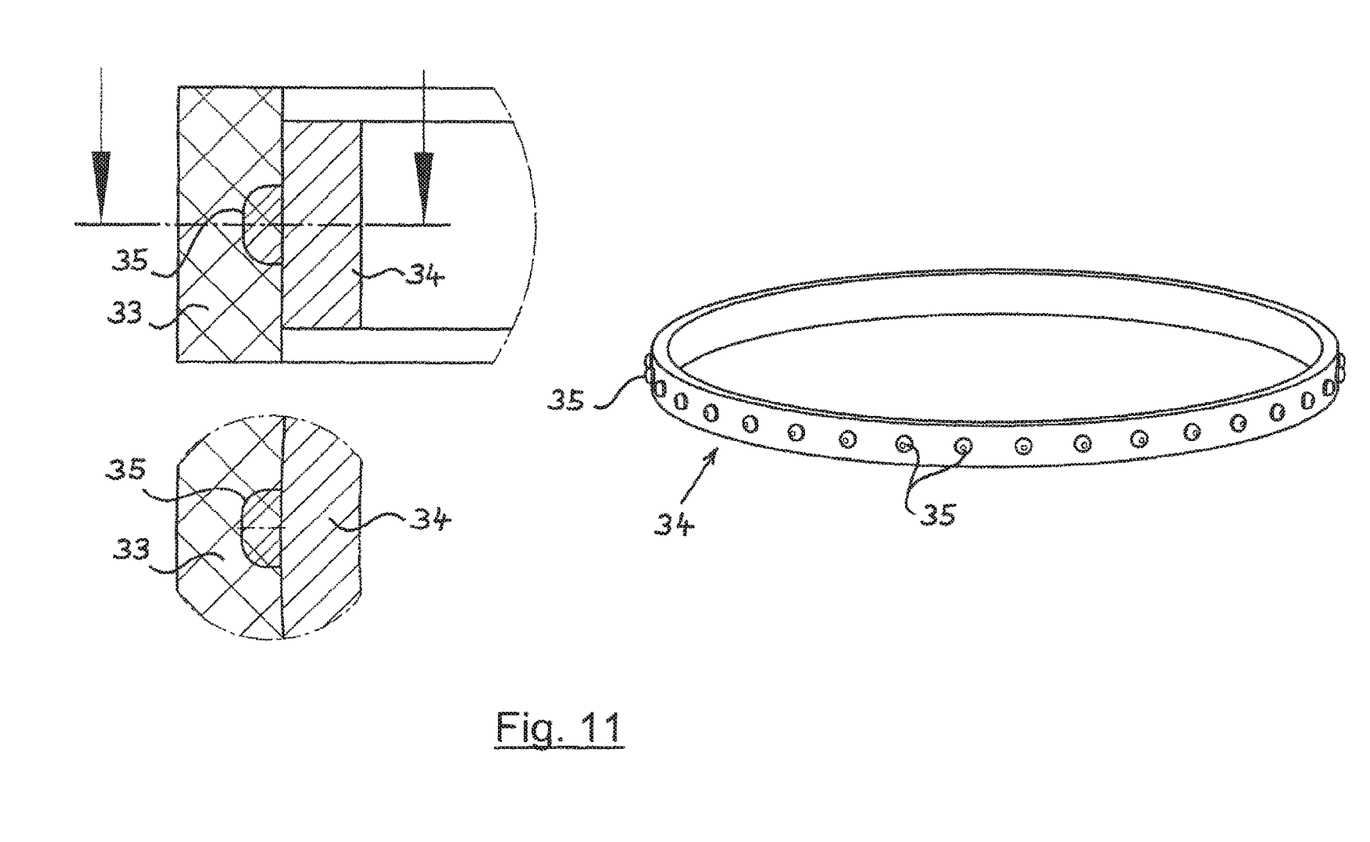

In FIG. 11, radial engagement contours 35 on the outer periphery of seal bearer 34 are formed by a peripheral series of radially outward-protruding cams or lugs, situated at a distance from one another in the peripheral direction, each having a round contour.

Figure 12:
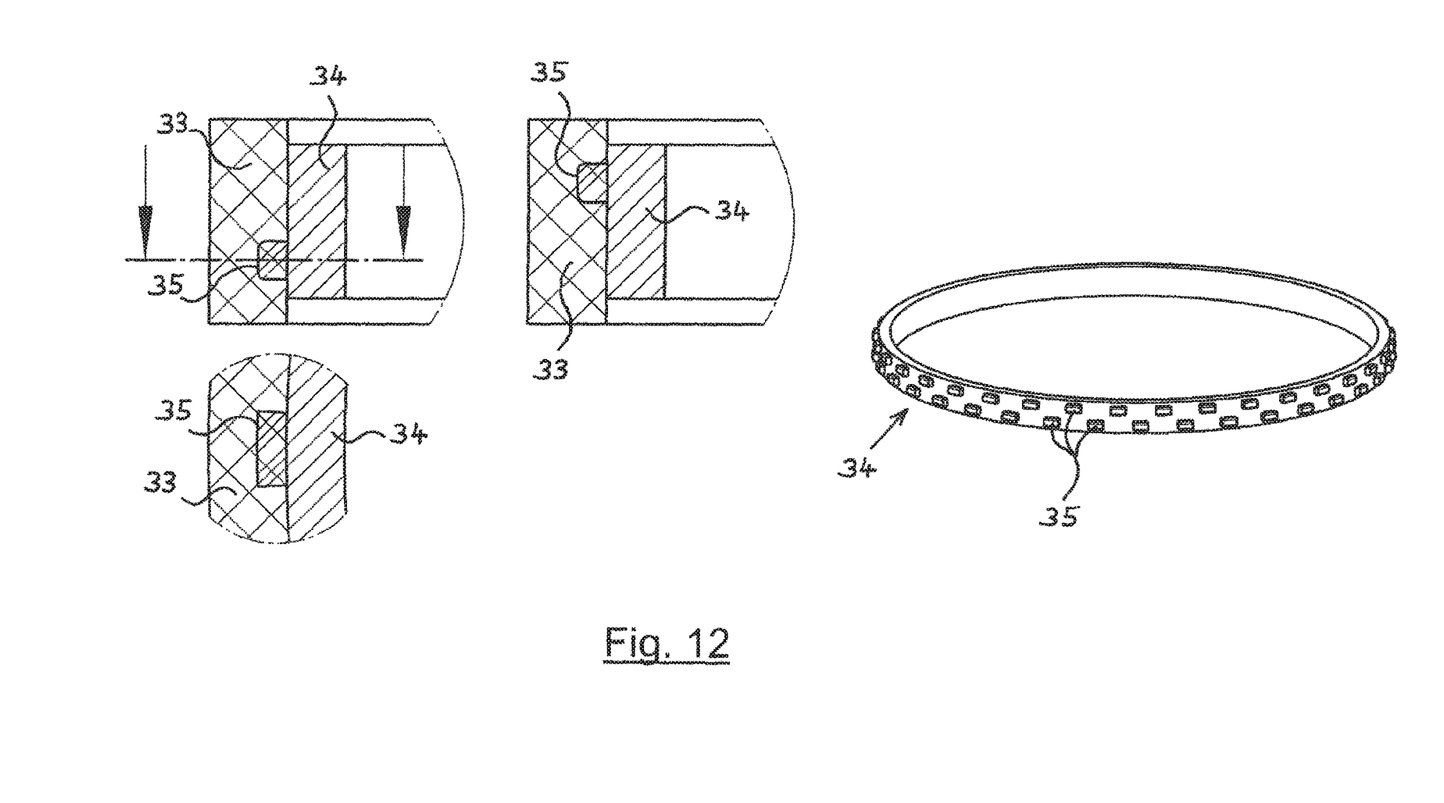

In FIG. 12, radial engagement contours 35 on the outer periphery of seal bearer 34 are formed by two peripheral series, parallel to one another, of radially outward-protruding cams or lugs at a distance from one another in the peripheral direction, each having a rectangular contour.

Figure 13:
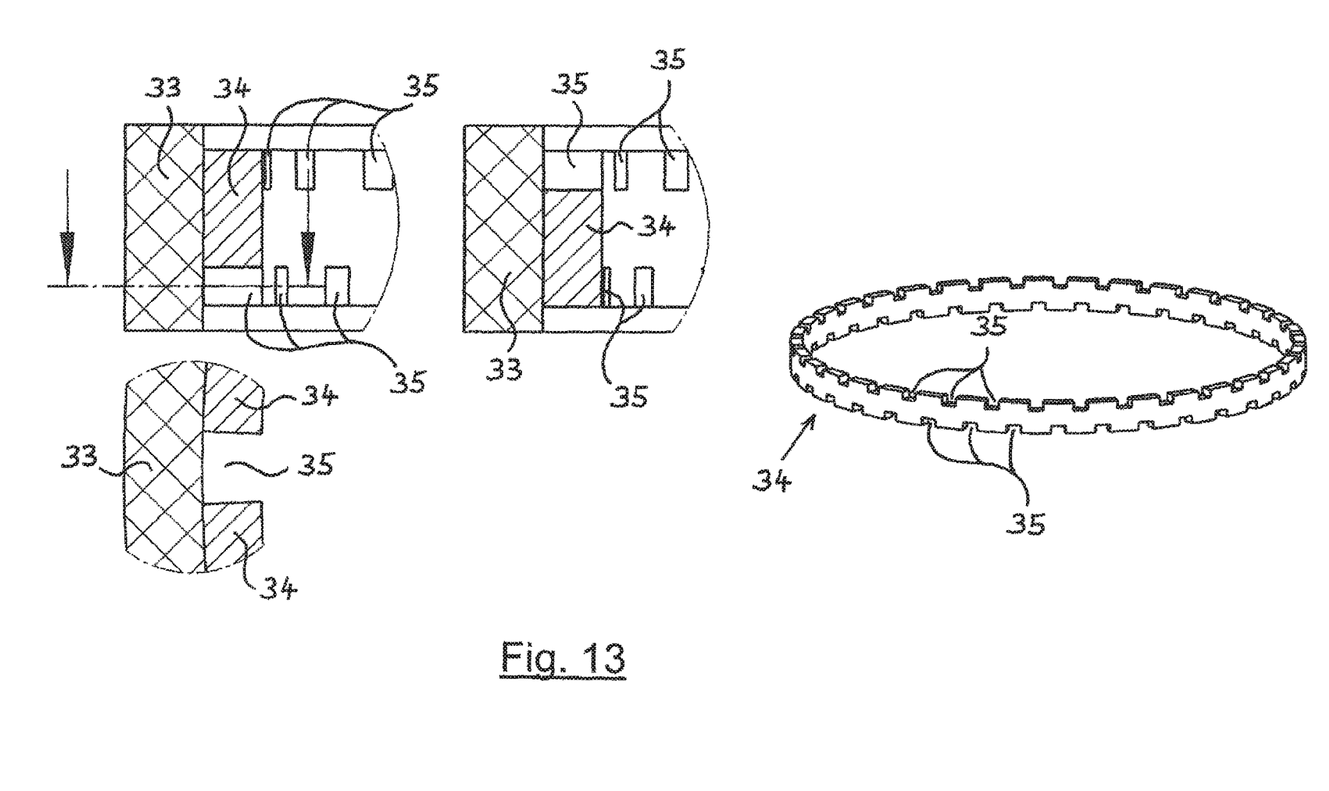

Finally, in FIG. 13, radial engagement contours 35 on the outer periphery of seal bearer 34 are formed by two peripheral series on both axial edges of seal bearer 34 of radially outwardly open and axially outwardly open indentations or recesses.

All radial engagement contours 35 described above as examples on the basis of FIGS. 8 through 13 have the desired property that they come into contact with seal 33 at the latest during installation of the filter, in such a way that during disassembly of the filter with removal of the filter insert from the housing, seal 33 is reliably held on seal bearer 34, and is carried along with the filter insert and with seal bearer 34.

FIGS. 8 through 13 show only some suitable embodiments of seal bearer 34; the lugs, cams, holes, or recesses, or other engagement contours on or in seal bearer 34 can have any shape or contour that is suitable for holding seal 33 on seal bearer 34.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 filter
2 housing
20 free edge of 2
21 inner periphery of 20
22 inner periphery of 2
23 diameter step
3 filter insert
30 filter material body
31 end disc
32 central perforation in 31
33 seal on 3
34 seal bearer on 3
35 radial engagement contours on 34
36 axial stops on 34
37 hook arms on 34
38 through-openings
4 connecting flange
45 sealing surface on 4 for 33

The invention claimed is:
1. A filter configured to be attached to a connecting flange, the filter comprising
    an exchangeable filter insert having a hollow cylindrical filter material body enclosed at its end faces by two end discs, comprising:
        a seal bearer comprising an outer peripheral bearing surface,
        a seal situated on the outer peripheral bearing surface, such that an outer peripheral surface of the seal forms a radially outermost surface of the exchangeable filter insert,
    a cup-shaped housing that, in a mounted state, is configured to be sealed at a free end thereof by the seal against a sealing surface of the connecting flange,
    wherein the seal is a sealing ring having a cross-section that is rectangular in an unloaded initial state, and wherein radial engagement contours are situated on the outer periphery of the seal bearer in a position such that when the housing is mounted, the seal is configured to be pressed into the radial engagement contours with axial shortening and radial expansion at an inner periphery of the seal, and is configured to remain in radial engagement with the radial engagement contours to be permanently reshaped to provide a reliable carrying along of the seal during removal of the housing and filter insert from the connecting flange, wherein stops are situated on the outer periphery of the seal bearer, in an axial direction thereof and with an axial distance from one another, which stops limit an axial play of the seal on the seal bearer to a specific extent, wherein on the seal bearer, in an axial edge region facing the filter insert hook arms are situated that point axially in a direction toward an interior of the housing, which arms are configured to be compressed radially inward, so as to be capable of resetting, through contact with an inner periphery of the housing when the housing is mounted, and wherein each hook arm forms at a free end an axial stop in the form of a lug.

2. The filter as recited in claim 1, wherein the seal is an extruded sealing ring made of an elastomer.

3. The filter as recited in claim 2, wherein the elastomer is one of
an ethylene acrylate,
a polyacrylate rubber,
a nitrile rubber,
a fluorosilicone rubber,
an ethylene propylene diene rubber, or
a fluorine rubber,
having a hardness between 60 and 70 Shore A.

4. The filter as recited in claim 1, wherein one of the stops is formed by the radial engagement contours.

5. The filter as recited in claim 1, wherein the radial engagement contours comprise one or more peripheral ribs or grooves, made continuous or segmented in the peripheral direction, formed on the outer periphery of the seal bearer.

6. The filter as recited in claim 1, wherein the radial engagement contours comprise one or more peripheral series of holes or blind holes or lugs or cams, made continuous or segmented in the peripheral direction, formed on the outer periphery of the seal bearer.

7. The filter as recited in claim 1, wherein the radial engagement contours comprise a series of axially outwardly open indentations or recesses, running peripherally on an axial edge of the seal bearer, or two such series, running peripherally on both axial edges of the seal bearer, in either case made continuous or segmented in the peripheral direction, formed on the outer periphery of the seal bearer.

8. A filter insert for use in a filter configured to be attached to a connecting flange comprising a cup-shaped housing that, in a mounted state, is configured to be sealed at its free end by a peripheral seal against a sealing surface of the connecting flange, and the peripheral seal being situated on an outer periphery of a peripheral seal bearer that forms a part of the filter insert, the filter insert comprising:
a hollow cylindrical filter material body enclosed at its end faces by two end discs,
the peripheral seal bearer comprising an outer peripheral seal bearing surface, and
the peripheral seal situated on the outer peripheral seal bearing surface, such that an outer periphery of the peripheral seal forms a radially outermost surface of the filter insert, wherein the peripheral seal is a sealing ring having a rectangular cross-section in an unloaded initial state, wherein radial engagement contours are situated on the outer peripheral seal bearing surface of the peripheral seal bearer, wherein during mounting of the housing of the filter, the peripheral seal is configured to be pressed into the radial engagement contours, and permanently reshaped, with axial shortening and radial expansion at its inner periphery to provide a reliable carrying along of the peripheral seal during removal of the housing and filter insert from the connecting flange, wherein stops are situated on the outer periphery of the peripheral seal bearer, in the axial direction thereof and with an axial distance from one another, which stops limit an axial play of the peripheral seal on the peripheral seal bearer to a specific extent, wherein on the seal bearer, in an axial edge region facing the filter insert hook arms are situated that point axially in a direction toward an interior of the housing, which arms are configured to be compressed radially inward, so as to be capable of resetting, through contact with an inner periphery of the housing when the housing is mounted, and wherein each hook arm forms at a free end an axial stop in the form of a lug.

9. The filter insert as recited in claim 8, wherein the peripheral seal is an extruded sealing ring made of an elastomer.

10. The filter insert as recited in claim 9, wherein the elastomer is
an ethylene acrylate or polyacrylate rubber,
a nitrile rubber,
a fluorosilicone rubber,
an ethylene propylene diene rubber, or
a fluorine rubber,
having a hardness between 60 and 70 Shore A.

11. The filter insert as recited in claim 8, wherein at least one of the stops is formed by the radial engagement contours.

12. The filter insert as recited in claim 8, wherein the radial engagement contours comprise one or more peripheral grooves or ribs, made continuous or segmented in the peripheral direction, formed on the outer periphery of the seal bearer.

13. The filter insert as recited in claim 8, wherein the radial engagement contours comprise one or more peripheral series of holes or blind holes or lugs or cams, made continuous or segmented in the peripheral direction, formed on the outer periphery of the seal bearer.

14. The filter insert as recited in claim 8, wherein the radial engagement contours comprise a series of axially outwardly open indentations or recesses, running peripherally on an axial edge of the seal bearer, or two such series, running peripherally on both axial edges of the seal bearer, in either case made continuous or segmented in the peripheral direction, formed on the outer periphery of the seal bearer.

15. A filter configured to be attached to a connecting flange, the filter comprising
an exchangeable filter insert having a hollow cylindrical filter material body, comprising:

a seal bearer comprising an outer peripheral bearing surface, a seal situated on the outer peripheral bearing surface, such that an outer peripheral surface of the seal forms a radially outermost surface of the exchangeable filter insert, a cup-shaped housing that, in a mounted state, is configured to be sealed at a free end thereof by the seal against a sealing surface of the connecting flange, wherein the seal is a sealing ring having a cross-section that is rectangular in an unloaded initial state, and wherein radial engagement contours are situated on the outer periphery of the seal bearer in a position such that when the housing is mounted, the seal is configured to be pressed into the radial engagement contours with axial shortening and radial expansion at an inner periphery of the seal, and is configured to remain in radial engagement with the radial engagement contours to be permanently reshaped, wherein stops are situated on the outer periphery of the seal bearer, in an axial direction thereof and with an axial distance from one another, which stops limit an axial play of the seal on the seal bearer to a specific extent, wherein on the seal bearer, in an axial edge region facing the filter insert hook arms are situated that point axially in a direction toward an interior of the housing, which arms are configured to be compressed radially inward, so as to be capable of resetting, through contact with an inner periphery of the housing when the housing is mounted, and wherein each hook arm forms at a free end an axial stop in the form of a lug.

16. A filter insert comprising:

a hollow cylindrical filter material body, a seal bearer comprising an outer peripheral seal bearing surface, and a seal situated on the outer peripheral seal bearing surface, such that an outer periphery of the seal forms a radially outermost surface of the filter insert, wherein the seal is a sealing ring having a rectangular cross-section in an unloaded initial state, wherein radial engagement contours are situated on the outer peripheral seal bearing surface of the seal bearer, wherein stops are situated on the outer periphery of the seal bearer, in the axial direction thereof and with an axial distance from one another, which stops limit an axial play of the seal on the seal bearer to a specific extent, wherein on the seal bearer, in an axial edge region facing the filter insert hook arms are situated that point axially in a direction toward an interior of the housing, which arms are configured to be compressed radially inward, so as to be capable of resetting, through contact with an inner periphery of the housing when the housing is mounted, and wherein each hook arm forms at a free end an axial stop in the form of a lug.

* * * * *